United States Patent [19]
Fink

[11] 3,828,550
[45] Aug. 13, 1974

[54] COUPLING LINK
[75] Inventor: Richard H. Fink, York, Pa.
[73] Assignee: Campbell Chain Company, York, Pa.
[22] Filed: Jan. 12, 1972
[21] Appl. No.: 217,134

[52] U.S. Cl. .................................................. 59/85
[51] Int. Cl. ............................................ F16g 15/02
[58] Field of Search .............................. 59/85, 86

[56] References Cited
UNITED STATES PATENTS

| | | | |
|---|---|---|---|
| 1,513,729 | 11/1924 | Adams | 58/85 |
| 3,134,221 | 5/1964 | Bergman | 59/85 |
| 3,373,560 | 3/1968 | Manney | 59/85 |

FOREIGN PATENTS OR APPLICATIONS

| | | | |
|---|---|---|---|
| 1,415,253 | 9/1965 | France | 59/85 |

Primary Examiner—Charles W. Lanham
Assistant Examiner—Gene P. Crosby
Attorney, Agent, or Firm—Donnelly, Maky, Renner & Otto

[57] ABSTRACT

A coupler link having two U-shape half links hingedly joined at the interdigited ends thereof by a pin extending through such ends, the pin being held in place against axial movement by a retaining member interposed between such ends and about the pin. The retaining member includes a body having a bore therethrough with a counterbore at one end thereof and a spring clip positioned and held within the counterbore, such clip being coaxial with the bore and of slightly smaller diameter. The spring clip is adapted slightly to expand upon the insertion of the pin until an annular groove on the pin is in alignment with such spring clip allowing the same to contract embracingly against the pin, thereby to lock the pin in position.

4 Claims, 5 Drawing Figures

PATENTED AUG 13 1974 3,828,550
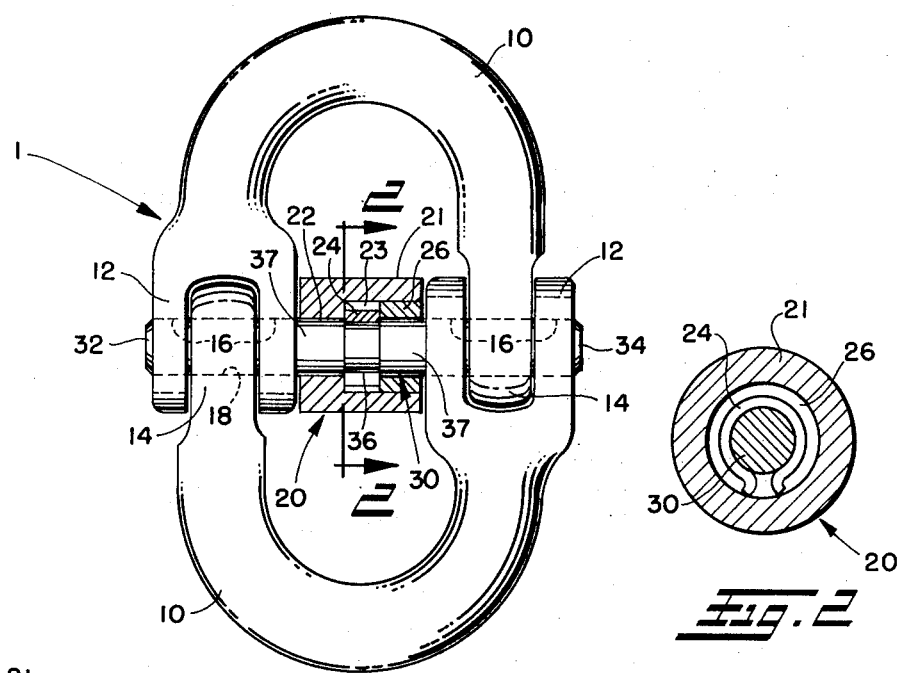
Fig.1
Fig.2
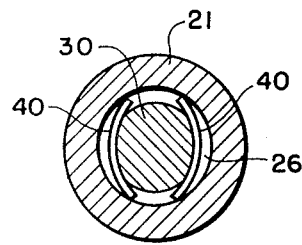
Fig.3
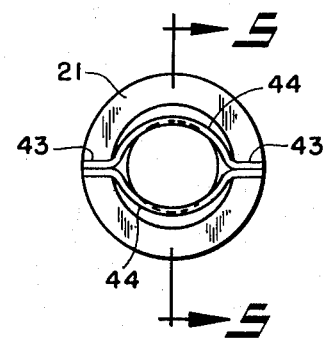
Fig.4
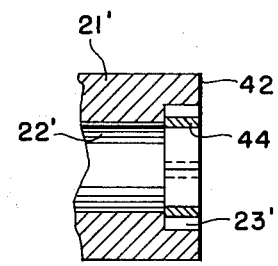
Fig.5

COUPLING LINK

This invention relates to a coupler link for joining chains or the like and more particularly to an improved retaining member for maintaining the joining pin thereof in a fixed axial position to prevent accidental disengagement of the parts so joined.

Coupler links comprising two generally U-shape half links hingedly joined by means of a pin held in position by some form of locking mechanism are well known in the art. The coupler link is ideally economically manufactured, capable of easy assembly and disassembly preferably without special tools, and capable of continued operational service without unitentional disengagement of the parts. Applicant is not aware of a prior art device that meets all of the above requirements due primarily to deficiencies in the locking mechanism used.

Reference may be had, for example, to U.S. Pat. No. 3,373,560 wherein a coupler link is disclosed having a pin locking means including a clip member embracing a reduced diametrical portion in the pin with such clip member being surrounded by two collar members of larger diameter. The express purpose of the collars is to protect the locking device by presenting a narrow throat leading to the clip to preclude the possibility of damage thereto. However, the exposure of the locking clip inherently provides an opportunity for damage, and the proposed use of a synthetic material covering sleeve for the clip not only necessitates additional manufacture expense and field assembly but also is subject to failure. For other conventional coupler link disclosures which vary primarily in the locking mechanisms used, reference may be had to U.S. Nos. 1,513,729 and 3,134,221.

Accordingly, it is the primary object of the present invention to provide a coupler link which is easily assembled and disassembled and which is substantially free from accidental disengagement of the parts.

It is an important object of the present invention to provide a pin retaining means which is a single assembled unit and has a spring clip therein adapted to embrace and hold the pin in a predetermined axial position. This is accomplished by having a body member with a bore therethrough and a counterbore at one end thereof, such body member having a spring clip received and held in the counterbore, which clip is adapted to cooperate with a reduced diametrical portion on the pin to hold the same.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

In the drawing:

FIG. 1 is an elevation of an assembled coupler link according to the present invention, with the retaining member shown in section;

FIG. 2 is a vertical section of the retaining member taken substantially along line 2—2 of FIG. 1;

FIG. 3 is a section similar to FIG. 2 showing an alternative spring form embodiment;

FIG. 4 is an end elevation of another retaining member embodiment; and

FIG. 5 is a fragmentary section taken substantially along line 5—5 in FIG. 4.

Referring now to FIG. 1, the coupler link indicated generally at 1 includes two substantially identical U-shaped half links 10, retaining member 20, and hinge pin 30.

Each half link 10 has a clevis 12 at the terminal portion of one leg and a tongue like projection 14 at the terminal portion of the other leg. The clevis and tongue portions are provided with apertures 16 and 18, respectively, that are in axial alignment when the half links are interdigited by positioning the tongues 14 into the opposing clevises 12 as shown in FIG. 1.

The retaining member 20 includes a cylindrical body 21 having a longitudinal bore 22 and a coaxial counterbore 23. The body 21 is substantially equal in width to the distance between the opposed clevis portions of the assembled half links, thereby to preclude any significant axial movement of the retaining member 20. A spring clip 24 generally annular in shape is received adjacent the blind end of counterbore 23, such spring clip normally being of a diameter slightly less than the diameter of bore 22. The spring clip is maintained within the counterbore by holding sleeve 26 which is staked or otherwise suitably fastened to body 21, such sleeve having an inner diameter which is substantially equal to the diameter of bore 22.

Pin 30 is approximately coextensive with the maximum width of the assembled half links and is of a diameter substantially equal to or slightly less than the diameters of bore 22 and aligned holes 16 and 18. The pin has chamfered ends 32 and 34 and a central portion of reduced diameter, such reduction forming an annular groove 36 and two pin sections 37 of increased diameter.

In assembly, the two half links are preliminarily positioned with the respective tongues and clevises thereof interdigited as shown and the retaining member 20 is then positioned between the ends so that the bore therethrough is in alignment with holes 16 and 18. The pin 30 is then driven partially therethrough with the chamfered end of such pin camming the spring clip 24 outwardly thereby slightly to expand the same sufficiently to allow one end 37 of the pin 30 to pass therethrough. When the annular groove 36 is in alignment or registry with spring clip 24, the latter will naturally contract or return to its normal position thereby embracingly to bear against the surface of such groove. The spring thus serves to lock the pin in the axial position shown, and the coupling link is thereby substantially free from any possibility of axial displacement of the pin which would result in disassembly of the coupler link.

Referring now to FIG. 3, a different spring form for retaining member 20 of FIG. 1 is illustrated. In such form, two identical leaf springs 40 are positioned adjacent the blind end of counterbore 23 and held in such position by a staked sleeve such as 26, the ends of the two springs being in engagement with the wall of the counterbore. Thus when the pin 30 is passed through aligned openings 16 and 18 and into member 20, the two leaf springs 40 will bow outwardly to allow the enlarged end 37 of pin 30 to pass therethrough until the reduced diameter portion of the pin is in alignment with such springs. With such pin placement, the springs will tend naturally to return to their normal position thereby to bear against the groove 36 in the shaft to hold the same against accidental axial displacement.

Referring now to FIGS. 4 and 5, the body 21' of yet another embodiment also has a bore 22' running longitudinally therethrough with a counterbore 23' at one end thereof, but such counterbore is of relatively limited extent as shown in FIG. 5. The end 42 of body 21 adjacent counterbore 23' is provided with two diametrically opposed horizontal grooves 43. Such grooves are of a width and depth limited to accept the outwardly bent ends of two leaf springs 44 as best shown in FIG. 4. The extent of curvature in the arcuate portions of springs 44 is predetermined so that in the unbiased condition thereof the minor axis of the spring form is of smaller magnitude than the diameter of the bore 22.

The pin used with the retaining member of FIGS. 4 and 5 has the reduced diametrical portion thereof axially or laterally shifted to coincide with the positioning of the springs 44. As with the other embodiments, the spring is adapted slightly to expand to allow the enlarged end portion of the pin to pass therethrough until the groove of the pin is in alignment with the springs 44.

Other modes of applying the principles of the invention may be employed, change being made as regards the details described, provided the features stated in any of the following claims, or the equivalent of such be employed.

The embodiments of the invention in which an exclusive property or privilege is claimed are defined as follows:

1. A coupling link for joining chains or the like comprising two half links having interdigited ends with aligned holes therethrough, a pin extending through such holes for hingedly joining the half links, and a retaining means interposed between the ends and substantially spanning the distance between the inner surfaces of the ends to receive and hold such a pin therewithin, said retaining means comprising a unitary assembly including a body member having a bore therethrough with a counterbore at one end thereof, spring means in the counterbore with a portion thereof normally having an inside dimension smaller than and in axial alignment with the bore, and holding means in the form of a sleeve closely received and locked in said counterbore and abutting one end of said spring means to maintain the other end of said spring means against the blind end of said counterbore, said spring means being adapted to retain the pin in a predetermined axial position.

2. A coupling link as set forth in claim 1, wherein said pin has a central portion of reduced diameter, with the spring means being adapted slightly to expand when the pin is passed through said body until said spring means is in alignment with a reduced diametrical portion of the pin, which positioning allows the spring means to return to its normal position, thereby embracingly to bear against said pin to lock the same in position.

3. A coupling link as set forth in claim 1, wherein said holding means comprises a sleeve positioned and held within said counterbore with the internal end thereof acting as a shoulder to said spring means, said sleeve having an inside diameter substantially equal to the diameter of said bore.

4. A coupling link for joining chains or the like comprising two half links having interdigited ends with aligned holes therethrough, a pin extending through such holes for hingedly joining the half links, and a retaining means interposed between the ends to receive and hold such pin therewithin, such retaining means comprising a body having a bore therethrough with a counterbore at one end thereof, spring means in the counterbore with a portion thereof normally having a dimension smaller than and in axial alignment with the bore to retain the pin in a predetermined position, said spring means having projections that are received in grooves in the body to retain the spring means in said counterbore.

* * * * *